(12) United States Patent
Bodine et al.

(10) Patent No.: US 7,346,647 B2
(45) Date of Patent: Mar. 18, 2008

(54) SYSTEM AND METHOD FOR INTERFACING WITH EXISTING SYSTEM MANAGEMENT PRODUCTS OR SOFTWARE SOLUTIONS

(75) Inventors: Gregory L. Bodine, Long Grove, IL (US); Andrew J. Anderson, Broomfield, CO (US); John P. Kane, Saint James, NY (US)

(73) Assignee: Computer Associates Think, Inc., Islandia, NY (US)

( * ) Notice: Subject to any disclaimer, the term of this patent is extended or adjusted under 35 U.S.C. 154(b) by 185 days.

(21) Appl. No.: 10/417,028

(22) Filed: Apr. 15, 2003

(65) Prior Publication Data

US 2003/0200319 A1    Oct. 23, 2003

Related U.S. Application Data

(60) Provisional application No. 60/373,893, filed on Apr. 19, 2002.

(51) Int. Cl.
*G06F 15/16* (2006.01)

(52) U.S. Cl. .................. 709/201; 709/205; 709/206; 709/202

(58) Field of Classification Search .............. 709/200, 709/223, 217, 227, 201, 202, 205, 206
See application file for complete search history.

(56) References Cited

U.S. PATENT DOCUMENTS

| | | | | |
|---|---|---|---|---|
| 5,508,732 A | | 4/1996 | Bottomley et al. | |
| 5,640,446 A | * | 6/1997 | Everett et al. | 379/114.28 |
| 5,815,571 A | * | 9/1998 | Finley | 713/189 |
| 5,850,446 A | | 12/1998 | Berger et al. | |
| 5,966,431 A | * | 10/1999 | Reiman et al. | 379/115.01 |
| 5,996,010 A | | 11/1999 | Leong et al. | |
| 6,002,767 A | | 12/1999 | Kramer | |
| 6,064,979 A | * | 5/2000 | Perkowski | 705/26 |
| 6,119,105 A | | 9/2000 | Williams | |
| 6,141,689 A | * | 10/2000 | Yasrebi | 709/228 |

(Continued)

FOREIGN PATENT DOCUMENTS

EP    1 016 989 A2    7/2000

OTHER PUBLICATIONS

"J1n1 Architectural Overview"Technical White Paper, 'Online! Jan. 1999, pp. 1-21, X?002264752 USA Retrieved from the Internet: <URIL:http://-s.sun.com/software/jlnl/whitepapers/architecture.html> retrieved on Dec. 11, 2003.*

(Continued)

*Primary Examiner*—William Vaughn
*Assistant Examiner*—Kristie Shingles
(74) *Attorney, Agent, or Firm*—Pillsbury Winthrop Shaw Pittman, LLP

(57) ABSTRACT

A system and method for providing a consistent interface with different system products or software solutions includes one or more system units or machines wherein the different system products or software solutions (instruments) reside. A service request can be made to an instrument gateway associated with a particular system unit or machine that includes an instrument that can service the request. The instrument gateway selects an instrument sponsor associated with that particular instrument to invoke the requested service from that particular instrument.

24 Claims, 2 Drawing Sheets

U.S. PATENT DOCUMENTS

| | | | |
|---|---|---|---|
| 6,145,001 A | 11/2000 | Scholl et al. | |
| 6,253,027 B1 | 6/2001 | Weber et al. | |
| 6,308,207 B1* | 10/2001 | Tseng et al. | 709/224 |
| 6,457,049 B2* | 9/2002 | Lewis et al. | 709/223 |
| 6,496,858 B1* | 12/2002 | Frailong et al. | 709/221 |
| 6,542,912 B2* | 4/2003 | Meltzer et al. | 715/501.1 |
| 6,667,736 B1* | 12/2003 | Bhansali et al. | 345/171 |
| 6,697,815 B1* | 2/2004 | Wilson | 707/102 |
| 6,708,074 B1* | 3/2004 | Chi et al. | 700/121 |
| 6,708,272 B1* | 3/2004 | McCown et al. | 713/151 |
| 6,779,027 B1* | 8/2004 | Schunicht et al. | 709/223 |
| 6,826,597 B1* | 11/2004 | Lonnroth et al. | 709/207 |
| 6,842,906 B1* | 1/2005 | Bowman-Amuah | 719/330 |
| 6,857,076 B1* | 2/2005 | Klein | 713/189 |
| 6,877,163 B1* | 4/2005 | Jones et al. | 719/332 |
| 6,965,777 B1* | 11/2005 | Cast et al. | 455/466 |
| 6,993,774 B1* | 1/2006 | Glass | 719/330 |
| 7,010,749 B2* | 3/2006 | Hasha et al. | 715/762 |
| 2002/0120685 A1* | 8/2002 | Srivastava et al. | 709/203 |
| 2003/0018950 A1* | 1/2003 | Sparks et al. | 717/100 |
| 2003/0020742 A1* | 1/2003 | Hasha et al. | 345/700 |
| 2003/0038825 A1* | 2/2003 | Wen et al. | 345/700 |
| 2003/0061328 A1* | 3/2003 | Abdelhadi et al. | 709/223 |
| 2004/0093515 A1* | 5/2004 | Reeves, Jr. | 713/201 |

OTHER PUBLICATIONS

"*Jini Architectural Overview*", Technical White Paper, Internet publication, http://www.sun.com/software/jini/whitepapers/architecture.html, pp. 1-21, XP002264752, Jan. 1999.

Rigole, Peter, et al., "*Using Jini to Integrate Home Automation in a Distributed Software-System*", Distributed Communities on the Web, 4th International Workshop, DCW 2002, Lecture Notes in Computer Science, vol. 2468, XP002264753, pp. 291-303, 2002.

International Search Report for PCT US03/12104, 7 pages, Dec. 30, 2003.

* cited by examiner

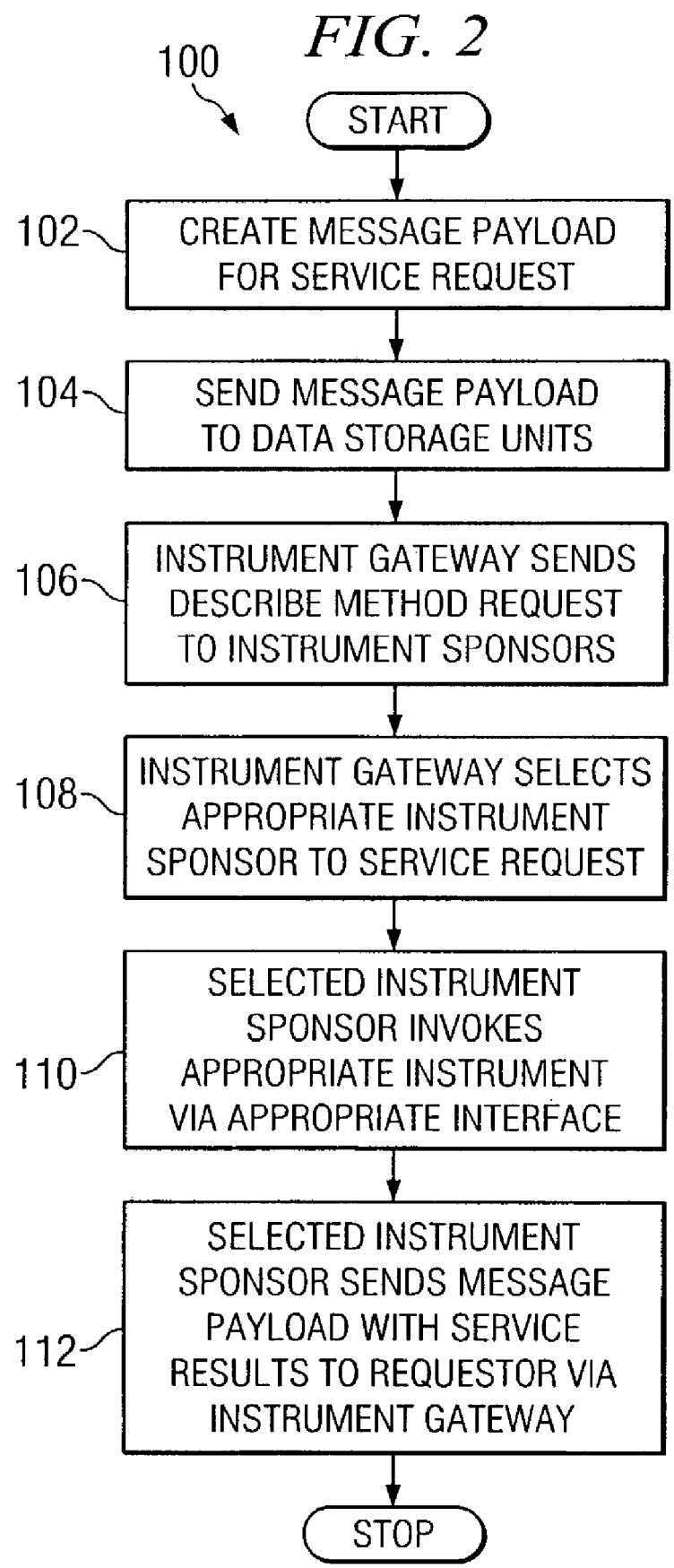

SYSTEM AND METHOD FOR INTERFACING WITH EXISTING SYSTEM MANAGEMENT PRODUCTS OR SOFTWARE SOLUTIONS

RELATED APPLICATION

This application claims the priority under 35 U.S.C. §119 of U.S. provisional application Ser. No. 60/373,893 filed Apr. 19, 2002.

TECHNICAL FIELD

The present disclosure relates in general to data resource management and, in particular, to a system and method that provides a consistent management interface with existing computer system management products or software solutions.

BACKGROUND

Computer systems management is an important element in the operation of an enterprise and it is also one of the fastest growing segments in the software marketplace. As increasing amounts of products (e.g., software and hardware) are being deployed and purchased, there is increased pressure for greater accountability. The enormous expenditures being made to acquire the hardware and software being deployed, coupled with increasing cost control pressures to demonstrate fiduciary responsibility, have led to the need for increased accountability, which has given systems management an even more critical role in the operation of enterprises.

Traditional systems management approaches utilizing a collection of different tools have proven cost-ineffective, because the costs associated with the using these separate management tools results in management costs that typically exceed the initial investment made in the hardware and software that needs to be managed. Often reducing the number of tools being is not feasible as each of the tools used has different capabilities and several of them need to be used to accomplish management objectives. Other traditional approaches to address this problem have been to promote Interface Standard Definitions or Proposals, which are eventually endorsed and implemented over time (e.g., typically in response to client pressure for standards compliance) in new versions of existing products.

SUMMARY

The present disclosure describes a mechanism through which a standard technique of interfacing to an existing technology can be realized. In one embodiment, standards-based, consistent interfaces are provided to existing products and related technologies, without requiring the introduction or development of new communications protocols, messaging constructs, or other major updates to those products or technologies.

Accordingly, a system and method for providing a consistent interface with different products or software solutions can include one or more system units or machines wherein the different system products or software solutions (instruments) reside. A service request can be made to an instrument gateway associated with a particular system unit or machine that includes an instrument that can service the request. The instrument gateway selects an instrument sponsor associated with that particular instrument to invoke the requested service from that particular instrument. The instrument sponsor provides a product-specific interface between the requestor and the specific instrument that can fulfill the service request. The instrument sponsor can return the service results to the requestor via the appropriate interface and the instrument gateway in a message payload. In one example embodiment, the message payload may comprise an XML message.

BRIEF DESCRIPTION OF THE DRAWINGS

For a more complete understanding of the present disclosure, reference is now made to the following descriptions, taken in conjunction with the accompanying drawings, in which:

FIG. 2 illustrates an example method that may be used to implement one example embodiment.

DETAILED DESCRIPTION

Figure 1:
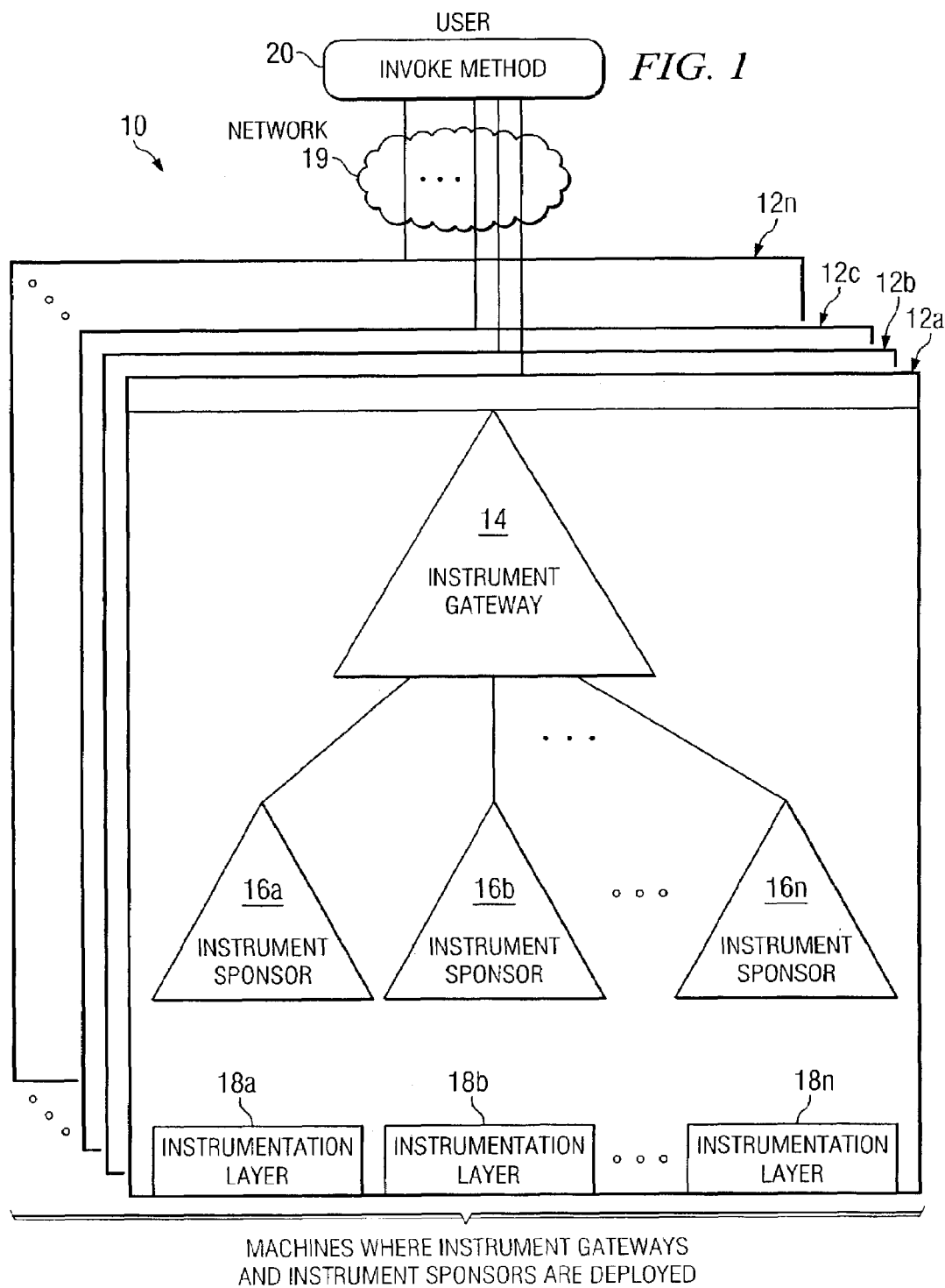
FIG. 1 illustrates an example system that can be used to implement one example embodiment.

FIG. 1 illustrates an example system 10 that can be used to implement one example embodiment. System 10 includes a plurality of system units or machines 12a-12n. Although four such system units 12a-12n are shown, this is for example purposes only and any suitable number of system units 12 may be used. For this example, the system units 12a-12n may be similarly configured. However, the system products, software, or instrumentation provided on each of system units 12a-12n may be different products or solutions such as, for example, a data storage machine.

Each system unit 12a-12n can include an instrument gateway 14. Instrument gateway 14 functions primarily as a dispatcher (e.g., object request broker) that can provide access to all instrument sponsors 16a-6n on a given system unit or machine 12a-12n. Essentially, instrument gateway 14 functions as a central conduit through which access to the instrument sponsors 16a-16n can be gained. Although three such instrument sponsors 16a-16n are shown, the present disclosure is not intended to be so limited, and any suitable number of instrument sponsors 16 may be used. Each instrument sponsor 16a-16n may function as a subordinate agent to the instrument gateway 14 on a given system unit or machine 12a-12n. Instrument sponsors 16a-16n function primarily to expose a standard interface to instrument gateway 14 through which access can be gained to the capabilities of the specific system products or software solutions to which the instrument sponsors are designed to work. Each instrument sponsor 16a-16n can function as an executable instantiation of a knowledge provider and can enable existing system products to interface with a client. As such, each instrument sponsor can serve as an actual knowledge generator or service provider.

A knowledge provider is an application that can be invoked from a portal server to provide access to information and services required by certain system manager portlets. A portlet is a portal window that enables the user of the portal to access various system management-related tasks. A portal server can be a machine on which a portal server application is being executed.

An elementary knowledge provider is a knowledge provider that provides access to services by direct invocation of one or more suitable interfaces offered by a single application in an instrumentation layer 18a-18n (e.g., an elementary knowledge provider can call upon a single instrument sponsor 16a-16n). A compound knowledge provider is a knowledge provider that provides access to services by direct invocation of one or more suitable interfaces offered by a plurality of single applications in an instrumentation layer 18a-18n (e.g., a compound knowledge provider can call upon multiple instrument sponsors 16a-16n).

Each instrumentation layer 18a-18n can function as an existing system product or software solution to which a client application 20 can interface (e.g., through an instrument sponsor 16a-16n). As such, the functions of the system products or software solutions in instrumentation layer 18a-18n may be called upon through portlets to perform the actual tasks of the products, software or instruments involved. The instrument sponsors can invoke the appropriate instrumentation layers or products 18a-18n in order to fulfill the client's service request.

In operation, a user or client application 20 attempts to interface with an existing system product, software solution, or related technology on one or more system units 12a-12n. For one example embodiment, system 10 may be considered as a Web-based portal that can provide a system administrator with a common interface to view, implement, report on, analyze, monitor, and automate system management procedures for many different system technologies (storage, security, network control, etc.), and across different platforms. Application 20 can create a standard message that describes the nature of the request for service being placed with the product involved. For example, application 20 can create an Extensible Markup Language (XML) message to describe the request being made. This message may be referred to generally as a message payload (or, for an XML message, as an "XML message payload"). The contents of an XML message payload can include XML tags and values that together constitute a query and formatting criteria associated with a transaction with or request for services for the system product, software solution, or instrument involved. The message payload, which can include a transaction or service request for a product, can be transported to a system unit 12a-12n where the product to be interfaced with is active. For example, the message payload can be transported from application 20 via the Internet (e.g., network 19) to a port on system unit (or machine) 12a-12n using a standard message transport protocol, such as, for example, HTTP 1.1 for a standard type message, or HTTPS 1.1 for a message payload that requires more secure handling than usual. The port on system unit 12a-12n that receives the transported message payload from application 20 can be coupled to and serviced by instrument gateway 14.

Network 19 may include any appropriate combination of public and/or private networks that can couple a user (e.g., 20) to one or more system units or machines 12a-12n. In one example embodiment, network 19 includes the Internet and any appropriate local area networks (LANs), metropolitan area networks (MANs), or wide area networks (WANs) coupling a user 20 to system units or machines 12a-12n.

Instrument gateway 14 can inspect the inbound message payload to determine which instrument sponsor 16a-16n is to be selected and invoked in order to service the request in the message payload from application 20. Preferably, each instrument sponsor 16a-16n can be associated with a specific system product, software solution, or instrument of instrumentation layer 18a-18n that can be invoked to perform the requested task(s). The selected instrument sponsor 16a-16n can then invoke the appropriate system product, software solution or instrument to perform the requested task(s). Notably, the selected instrument sponsor 16a-16n can be constructed to provide any product-specific interface(s) required to perform the requested task(s).

As described above, instrument gateway 14 can select and invoke an appropriate instrument sponsor 16a-16n to service the request from client application 20. For one example embodiment, each of the instrument sponsors 16a-16n can be software executable and run as an out-of-process application or in-process application with at least one of the following formats: Dynamic Link Library (DLL); Component Object Model (COM) object (e.g., Visual Basic (VB), Object Linking and Embedding (OLE), OLE Custom control (OCX), ActiveX, etc.); Java class; and VBScript. Pertinent information about the capabilities and properties of each instrument sponsor 16a-16n may be stored in a centrally accessible registration authority (not shown).

The registration authority can serve as a contact point to provide registration information regarding instrument sponsors 16a-16n to a Universal Description, Discovery and Integration (UDDI) directory and other Web-based service directories.

The registration information can include a digital signature for each instrument sponsor 16a-16n. The digital signature may be used (e.g., as an option) by the instrument gateway 14 on a given platform or system unit 12a-12n, in order to ensure that the particular instrument sponsor 16a-16n being loaded or invoked by instrument gateway 14 has not been tampered with. As such, for one example embodiment, a Microsoft sign code mechanism may be used for digitally signing DLLs, COM objects, Java classes, etc. in support of instrument sponsors 16a-16n.

When instrument gateway 14 sends a message payload to a selected instrument sponsor 16a-16n in order to invoke an appropriate system product or software solution of instrumentation layer 18a-18n, instrument gateway 14 can load the pertinent message information into the selected instrument sponsor in at least one of a number of ways. As such, the loading method used by instrument gateway 14 may vary depending on the platform and processing type of instrument sponsor 16a-16n involved. For example, if the selected instrument sponsor 16a-16n is to be used for an out-of-process method with a Windows-based platform, instrument gateway 14 can load the selected instrument sponsor with the pertinent message information by instantiating a suitable COM object (e.g., COM can institute an implicit NT Create Procedure) including the information. As another example, if the selected instrument sponsor 16a-16n is to be used for an out-of-process method with a UNIX-based platform, instrument gateway 14 can load the selected instrument sponsor with the pertinent message information via a shared library and/or a Fork or Exec command.

However, if the selected instrument sponsor 16a-16n is to be used for an in-process method with a Windows-based or UNIX-based platform, instrument gateway 14 can load the selected instrument sponsor with the pertinent message information by creating a thread including the information, and instantiating the thread so that the selected instrument sponsor 16a-16n can be executed as the thread (e.g., part of a program that can execute independently of other parts) under the control of instrument gateway 14.

As described above, each instrument sponsor 16a-16n can accept an incoming message payload (e.g., XML message payload) via instrument gateway 14 that identifies the system or software function being requested by the user (e.g., client application 20). Also, each instrument sponsor 16a-16n may output a message (e.g., XML message buffer) to the requester (e.g., application 20) via instrument gateway 14.

Specifically, the mechanisms used to convey messages between instrument gateway 14 and instrument sponsors 16a-16n may vary depending on the platform and processing type of the instrument sponsor used. For example, if an instrument sponsor 16a-16n is to be used for an out-of-process method on a Windows-based platform, a COM Remote Procedure Call (RPC) mechanism may be used to send the message to a process that is started by instrument gateway 14, but in other respects, runs separate from the master agent's (e.g., instrument gateway's) service. Using a COM RPC, a client program can send a message to a server with appropriate arguments, and the server can return a message containing the results of the program executed. As another example, if an instrument sponsor 16a-16n is to be used for an out-of-process method on a UNIX-based platform, the instrument sponsor can be invoked via a "Fork" or "Exec" command. As such, the instrument sponsor can read an incoming message (e.g., XML message) from a "stdin" field, and output a response message by writing to a "stdout" field. However, if an instrument sponsor 16a-16n is to be used for an in-process method (e.g., on a Windows-based or UNIX-based platform), at initiation, a handle or pointer may be passed to an inbound buffer (e.g., char *inbuff), and another pointer may be passed to an outbound buffer (e.g., char *outbuff).

The following is an example of UNIX-based code that may be used by instrument gateway 14 to invoke an instrument sponsor 16a-16n:

```
Loadlib( bebSubAjent.dll)
Beb.InvokeSub( "INIT")
wait for inbound data
if for bebAgent
    beb.InvokeSub("INVOKE",ib, ob);
    sendRply( ob );
    beb.InvokeSub("FREE", ob);
    continue;
```

The following is an example of code that may be used by an instrument sponsor 16a-16n to accept a message from instrument gateway 14 and respond:

```
fn: bebSubAject.dll
long_declspec( dllexport)_cdecl InvokeSub(
    PCHAR szFunction,
    ...
)
{
va_list argptr;
if ( stricmp( szFunction, "INITIALIZE") == 0 ){
  return ( ss.Initialize( ) );
}
else if( stricmp( szFunction,"TERMINATE") == 0 ){
  return ( ss.Terminate( ) );
}
else if ( stricmp( sxFunction,"INVOKE") == 0 ){
  char* ibXml;
  char** obXml;
  va_start( argptr, szFunction );
  ibXml = va_arg( argptr, char* );
  obXml = va_arg( argptr, char** );
  va_end( argptr );
  return ( ss.Invoke(ibXml, obXml ) );
}
else if ( stricmp( szFunction,"FREE") == 0 ){
  char* obj;
```

-continued

```
  va_start( argptr, szFunction );
  obj = va_arg( argptr, char* );
  va_end( argptr );
  return ( ss.Free(obj ) );
}
return 400;
}
```

Each instrument sponsor 16a-16n can perform a plurality of functions or methods that can be invoked via one or more message payloads (e.g., XML message payload) from instrument gateway 14. For example, an instrument sponsor 16a-16n may perform at least the following methods:

A "Describe" method may be used to ask an agent to provide information about itself. For example, if a "Describe" method is sent to an instrument gateway 14, the instrument gateway can respond with a message that describes itself, all currently installed instrument sponsors associated with that instrument gateway on the machine (system unit 12a-12n) on which the instrument gateway is executing, and all products or software solutions the instrument gateway can detect on the machine on which the instrument gateway is executing. If a "Describe" method is sent to an instrument sponsor, the instrument sponsor can describe itself. The following is an example of code for such a Describe method:

```
accepts
    <Method=describe/>
returns:
    <Version=string/>
    <ProdInterfaceInfo=(ProdInterface Type*)
    <PlatformInfo=string/>
    <CanIssueAsyncNotify=string/>   (y,n)
    <ReqDTDVersionID=(Version*) Version of Request
DTD this instrument sponsor supports
    <RespDTDVersionID=(Version*) Version of
Response DTD this instrument sponsor supports
    ProdInterfaceType(ProdName,Release,SubStat,
    Active)
      Name          CDATA Required
      Release       CDATA Required
      SubStat       Number (1,0) (1=instrument
      sponsor installed, 0=instrument sponsor
      not installed)
      Active Number (1,0) (1=Active,
      0=Inactive)
    Version(VersionInfo)
    VersionInfo CDATA
```

An "AsyncNotifySetDestination" method may be used to tell an instrument sponsor 16a-16n where it may send asynchronous notifications. The following is an example of code that can be used for an AsyncNotifySetDestination method:

```
accepts <Method=AsyncNotifySetDestination>
    <AsyncNotifySetDestinationType=string/>
      (trap,http)
    <AsyncNotifySetDestinationTargets=string/>
      (machine namelip addr, port ; machine
      namelip addr, port; etc.)
    <AsyncNotifySetDestinationPort=string/> (port)
returns <AsyncNotifySetDestinationStatus=string/>
      (success, failure)
```

-continued

```
            <AsyncNotifySetDestinationReason=string/>
                (explanation for failure)
```

A "ShowGrammar" method may be used to ask an agent to provide information about how to interface to itself. The following is an example of code that can be used for a ShowGrammar method:

```
accepts
    <Method=ShowGrammar/>
returns:
    <ResponseType=string/>    (URL, DTD, SCHEMA)
    <ResponseGrammar=string/>
```

An "Init" method may be used to instruct an agent to start. Typically, this method can be sent by an instrument gateway to an instrument sponsor when it is loading a message payload in that instrument sponsor. The following is an example of code that can be used for an Init method:

```
accepts
    <Method=Term/>
returns:
    <InitStatus=string/>
```

A "Term" method may be used to instruct an agent to shutdown. Typically, this message can be sent by an instrument gateway to an instrument sponsor when the instrument gateway is instructed (e.g., by a client application or system administrator) to shutdown an instrument sponsor. The following is an example of code that can be used for a Term method:

```
accepts
    <Method=Term/>
returns:
    <InitStatus=string/>
```

A "Configure" method may be used to set or query an instrument sponsor's configurable settings. When original configuration values are set for an instrument sponsor, these values are honored in subsequent restarts of that instrument sponsor on the platform involved. Notably, if multiple configuration settings are attempted in a single message, the instrument sponsor involved is required to place these configuration settings into effect all at once. If any of the attempts to set the new configuration values fail, all values can be rolled back to the configuration values that were in place before the Configure method was invoked. The following is an example of code that can be used for a Configure method:

```
accepts
    <Method=ConfigureSub/>
    <ConfigurePolarity=(ConfigPolarity*)
    <ConfigureSetting=(ConfigureVariable*)
```

-continued

```
returns:
    <ConfigureStatus=string/>    (success,
        failure)
    <ConfigureStatusReason=string/>    (explanation
        for failure)
ConfigurePolarity(Polarity)
    Polarity Number (1,0) (0=Get, 1=Set)
Polarity CDATA    (Valid values are get or set)
ConfigureVariable(VarName, VarValue)
VarName CDATA
```

VarValue CDATA

An "Invoke" method may be used to request a service (e.g., information retrieval, policy administration, action invocation, etc.) that an instrument sponsor 16a-16n can perform on a user's behalf. The following is an example of code that can be used for an Invoke method:

```
accepts
    <Method=InvokeSub, InstallProd, DeinstallProd,
        InitProd, TermProd, CallProd>
        <method specfic grammar>
    returns:
```

<InvokeStatus=string/>

An "Authenticate" method may be used to send credentials to an instrument sponsor 16a-16n, which the instrument sponsor can authenticate to determine whether or not to grant subsequent service requests sent by a user (e.g., client application 20) to that instrument sponsor. Preferably, instead of authenticating an instrument gateway 14, the Authenticate method can authenticate a service requestor whose request is presented to the instrument sponsor via the instrument gateway. Once the requester is authenticated, the MAC Addr or IP Addr (or other token that can identify the requester) can be cached or stored locally by the instrument sponsor involved. Subsequently, the instrument sponsor can retrieve the credentials from the local cache and make an access decision based on the retrieved credential information. As such, the instrument gateway 14 and all digitally signed agents have the ability to confirm the signature of instrument sponsors 16a-16n. The following is an example of code that can be used for an Authenticate method:

```
accepts
    <Method=Authenticate/>
    <UserID=userid string/>
    <Password=password/>
returns:
```

<AuthenticateStatus=string/>

FIG. 2 illustrates an example method 100 that may be used to implement one example embodiment. At step 102, a client or user (e.g., 20) creates a message payload (e.g., XML message payload) that includes a service request for a particular system product or software solution. At step 104, the client or user sends the message payload to an address associated with a portal for one or more system units or machines 12a-12n. For example, this address may be specified by a user, or determined based on the type of request being made.

At step 106, in response to receipt of the message payload including a service request, one or more instrument gateways 14 (e.g., each one associated with a specific system unit or machine 12a-12n) send a "Describe" method request to the instrument sponsors 16a-16n associated with that instrument gateway. In response to making a determination that an appropriate system product or software solution (instrument) to service the request is available via an instrument sponsor 12a-12n, at step 108, the instrument gateway 14 selects that instrument sponsor to service the request. At step 110, the selected instrument sponsor 12a-12n invokes the associated system product or software solution (instrument) from the instrumentation layer 18a-18n via a product-specific interface for that system product or software solution. For example, if an appropriate system product or software solution resides in the instrumentation layer as instrument 18a, then instrument gateway 14 can select instrument sponsor 16a (e.g., associated directly with instrument 18a) to invoke that instrument via an appropriate interface designed for that instrument to fulfill the service request made. At step 112, the selected instrument sponsor 16a-16n can send a message payload to the requestor (e.g., via instrument gateway 14) including the service results.

Although a preferred embodiment has been illustrated in the accompanying Drawings and described in the foregoing Detailed Description, it will be understood that the disclosure is not limited to the embodiment disclosed, but is capable of numerous rearrangements, modifications and substitutions without departing from the spirit of the invention as set forth and defined by the following claims.

What is claimed is:

1. A computer-implemented method for providing a consistent interface between a client application and a plurality of software instruments, the method comprising the steps of:

receiving a generic request message from the client application at a particular instrument gateway, wherein the particular instrument gateway is coupled between the client application and the plurality of software instruments, wherein the particular instrument gateway is associated with the plurality of software instruments, wherein the request message includes a message payload corresponding to a transaction or a service request to be processed by a particular one of the plurality of software instruments;

sending from the particular instrument gateway to each of a plurality of instrument sponsors a request for a description of the instrument sponsor;

determining, by the particular instrument gateway, which one of the plurality of instrument sponsors is associated with the particular one of the plurality of software instruments, wherein the determining is based, at least in part, on the request message from the client application and the descriptions of the instrument sponsors, wherein each of the plurality of instrument sponsors provides an interface to at least one of the plurality of software instruments;

invoking, by the particular instrument gateway, the determined one of the plurality of instrument sponsors thereby exposing an interface to the particular one of the plurality of software instruments;

invoking, by the determined one of the plurality of instrument sponsors, the particular one of the plurality of software instruments;

providing the message payload to the particular one of the plurality of software instruments through the exposed interface thereby allowing the particular one of the plurality of software instruments to process the message payload; and communicating, by the particular instrument gateway to the client application, a result provided by the particular one of the plurality of software instruments associated with the processed the message payload.

2. The method of claim 1, further comprising identifying, by the particular instrument gateway, the plurality of software instruments associated therewith upon the particular instrument gateway receiving the request message.

3. The method of claim 1, wherein the request message comprises an XML message including the message payload and an identifier that identifies the particular one of the plurality of software instruments.

4. The method of claim 1, wherein the determined one of the plurality of instrument sponsors serves as a knowledge provider.

5. The method of claim 1, wherein the client application is compatible with the particular one of the plurality of software instruments through the particular instrument gateway and the determined one of the plurality of instrument sponsors.

6. The method of claim 1, wherein the determined one of the plurality of instrument sponsors comprises an in-process application.

7. The method of claim 1, wherein the determined one of the plurality of instrument sponsors comprises an out-of-process application.

8. The method of claim 1, wherein the plurality of software instruments comprise a storage software instrument on a first platform and a security software instrument on a second platform.

9. A computer-implemented system that provides a consistent interface between a client application and a plurality of software instruments, the system comprising:

an instrument gateway that receives a generic request message from the client application, wherein the instrument gateway is coupled between the client application and the plurality of software instruments, wherein the instrument gateway is associated with the plurality of software instruments, wherein the request message includes a message payload corresponding to a transaction or a service request to be processed by a particular one of the plurality of software instruments;

a plurality of instrument sponsors, one of which is associated with the particular one of the plurality of software instruments, wherein the instrument gateway sends to each of the plurality of instrument sponsors a request for a description of the instrument sponsor and determines the one of the plurality of instrument sponsors that is associated with the particular one of the plurality of software instruments, wherein the determination is based, at least in part, on the request message from the client application and the descriptions of the instrument sponsors, wherein each of the plurality of instrument sponsors provides an interface to at least one of the plurality of software instruments;

wherein the instrument gateway invokes the determined one of the plurality of instrument sponsors thereby exposing an interface to the particular one of the plurality of software instruments;

wherein the determined one of the plurality of instrument sponsors invokes the particular one of the plurality of software instruments;

wherein the message payload is provided to the particular one of the plurality of software instruments through the exposed interface thereby allowing the particular one of the plurality of software instruments to process the message payload; and wherein the instrument gateway communicates a result to the client application, the result provided by the particular one of the plurality of software instruments associated with the processed the message payload.

10. The system of claim 9, wherein the instrument gateway identifies the plurality of software instruments associated with the instrument gateway when the instrument gateway receives the request message.

11. The system of claim 9, wherein the request message comprises an XML message including the message payload and an identifier that identifies the particular one of the plurality of software instruments.

12. The system of claim 9, wherein the determined one of the plurality of instrument sponsors serves as a knowledge provider.

13. The system of claim 9, wherein the client application is compatible with the particular one of the plurality of software instruments through the instrument gateway and the determined one of the plurality of instrument sponsors.

14. The system of claim 9, wherein the determined one of the plurality of instrument sponsors comprises an in-process application.

15. The system of claim 9, wherein the determined one of the plurality of instrument sponsors comprises an out-of-process application.

16. The system of claim 9, wherein the plurality of software instruments comprises a storage software instrument on a first platform and a security software instrument on a second platform.

17. Software for providing a consistent interface between a client application and a plurality of software instruments, the software comprising computer executable instructions resident on computer readable media and operable to:

receive a generic request message from the client application at a particular instrument gateway, wherein the particular instrument gateway is coupled between the client application and the plurality of software instruments, wherein the particular instrument gateway is associated with the plurality of software instruments, wherein the request message includes a message payload corresponding to a transaction or a service request to be processed by a particular one of the plurality of software instruments;

send from the particular instrument gateway to each of a plurality of instrument sponsors a request for a description of the instrument sponsor;

determine, using the particular instrument gateway, which one of the plurality of instrument sponsors is associated with the particular one of the plurality of software instruments, wherein the determination is based, at least in part, on the request message from the client application and the descriptions of the instrument sponsors, wherein each of the plurality of instrument sponsors provides an interface to at least one of the plurality of software instruments;

invoke, using the particular instrument gateway, the determined one of the plurality of instrument sponsors thereby exposing an interface to the particular one of the plurality of software instruments;

invoke, using the determined one of the plurality of instrument sponsors, the particular one of the plurality of software instruments;

provide the message payload to the particular one of the plurality of software instruments through the exposed interface thereby allowing the particular one of the plurality of software instruments to process the message payload; and communicate, using the particular instrument gateway to the client application, a result provided by the particular one of the plurality of software instruments associated with the processed the message payload.

18. The software of claim 17, wherein the computer executable instructions are further operable to identify, using the particular instrument gateway, the plurality of software instruments associated therewith upon the particular instrument gateway receiving the request message.

19. The software of claim 17, wherein the request message comprises an XML message including the message payload and an identifier that identifies the particular one of the plurality of software instruments.

20. The software of claim 17, wherein the determined one of the plurality of instrument sponsors serves as a knowledge provider.

21. The software of claim 17, the client application is compatible with the particular one of the plurality of software instruments through the particular instrument gateway and the determined one of the plurality of instrument sponsors.

22. The software of claim 17, wherein the determined one of the plurality of instrument sponsors comprises an in-process application.

23. The software of claim 17, wherein the determined one of the plurality of instrument sponsors comprises an out-of-process application.

24. The software of claim 17, wherein the plurality of software instruments comprise a storage software instrument on a first platform and a security software instrument on a second platform.

* * * * *